April 19, 1949.  Z. J. SOGORKA  2,467,635
DRAIN VALVE
Filed Dec. 17, 1946
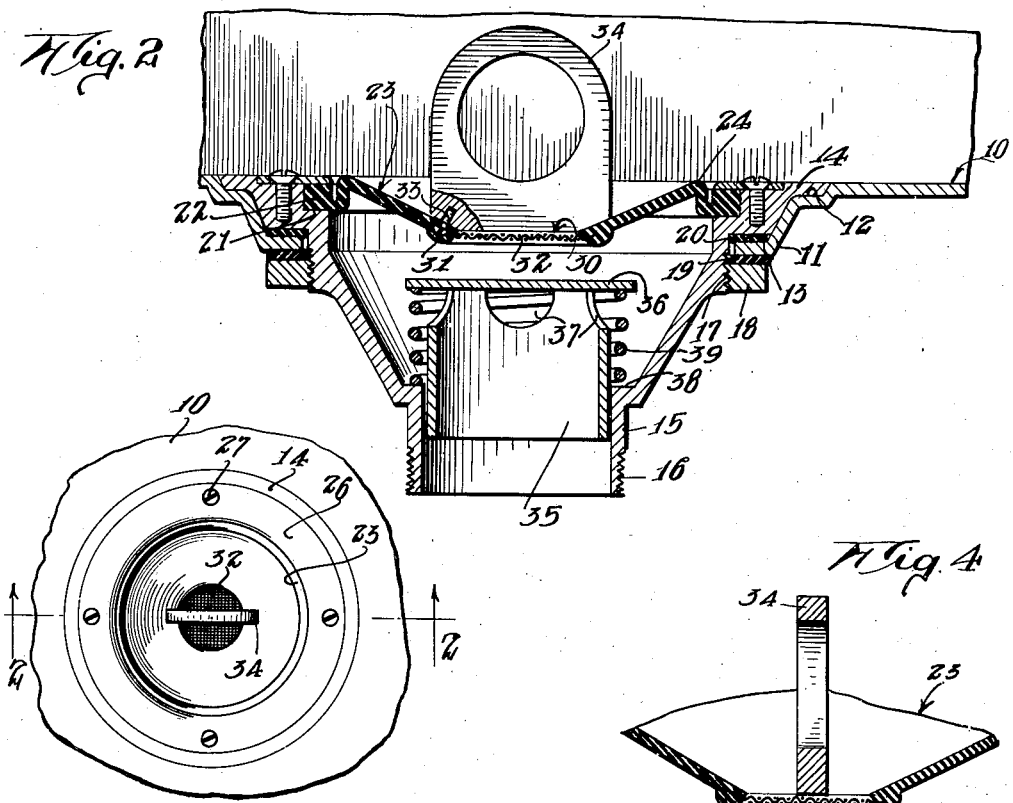
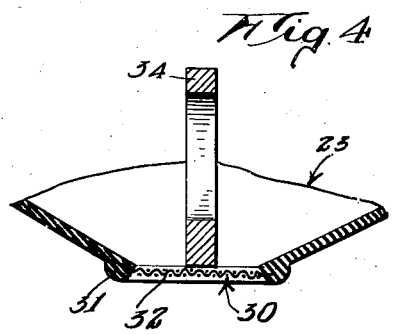
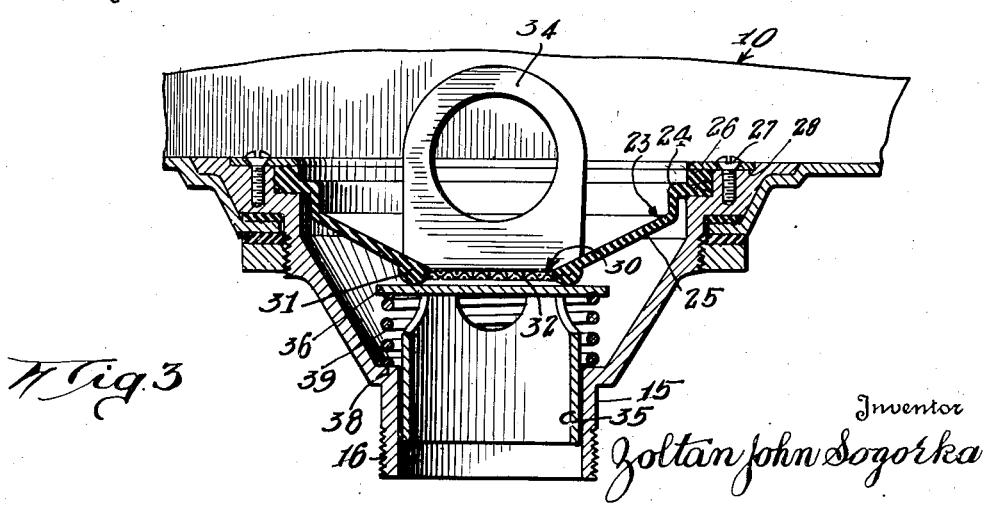
Inventor
Zoltan John Sogorka
By
Lyon & Lyon
Attorneys Patented Apr. 19, 1949

2,467,635

UNITED STATES PATENT OFFICE 2,467,635

DRAIN VALVE

Zoltan John Sogorka, Alhambra, Calif.

Application December 17, 1946, Serial No. 716,686

9 Claims. (Cl. 137—34.2)

This invention relates to drain valves and more particularly to a snap-type rubber diaphragm valve adapted in closed position to seal a drain, which drain is operable upon the accumulation of a predetermined hydrostatic head to open and prevent overflowing.

I am aware that it has hitherto been proposed to provide drain valves for wash basins, sinks and the like, which valves are responsive to a predetermined hydrostatic head to prevent overflow. However, the valves hitherto proposed have been of a complicated structure and costly to manufacture.

It is accordingly an object of this invention to provide a drain valve for sinks, wash basins and the like which opens responsive to a predetermined hydrostatic head and thus prevents overflow, and which is simple, durable and economical of manufacture.

It is another object of this invention to provide such a drain valve utilizing a snap rubber or rubber-like composition diaphragm.

It is a further object of this invention to provide a drain valve of the type disclosed which is readily disassembled for cleaning and adjustment.

Further objects and advantages will appear in the annexed specification, in which:

Figure 1 is a plan view of a drain provided with a valve of this invention;

Figure 2 is a section taken along the line 2—2 of Figure 1 showing the valve in open position;

Figure 3 is a section similar to Figure 2 showing the valve in closed position; and Figure 4 is a fragmentary section through the diaphragm at right angles to Figure 2.

Referring more particularly to the drawings, there is shown a wash basin or the like indicated at 10 having formed integral therewith a depending portion 11 having a shoulder 12 and a second shoulder 13. An insert 14 is provided resting upon the shoulders 12 and 13 and forming a drain body. The insert 14 is provided at its lower end with a pipe section 15 externally threaded as at 16 in order to receive a conventional trap or the like (not shown). The insert 14 is also externally threaded as at 17 and a ring 18 is threadedly secured thereon compressing washers 19 and 20 on either side of the shoulder 13, thus securing the insert 14 to the basin.

The insert 14 is provided with a shoulder 21 upon which rests a rib 22 of a diaphragm 23. The diaphragm 23 is formed of rubber or a rubber-like resilient composition and is upwardly folded as at 24 and again downwardly folded as at 25 when in open position.

Referring more particularly to Figure 3, it will be noted that the diaphragm 23 is adapted to snap as indicated in a manner reversing the folds 24 and 25 to form downward bends rather than upward bends. A ring 26 is provided suitably secured in any conventional manner as by means of the screws 27 on a shoulder 28 of the insert 14.

The diaphragm 23 has a circular aperture 30 formed at the center thereof and adjacent the edges of the circular aperture 30 the diaphragm has a thickened ring-like seat portion 31 formed therein. The circular aperture 30 is provided with a screen 32 secured in the rib 31 in any suitable fashion either by being embedded therein or as shown in Figure 3, the enlarged seat portions 31 may be split from the body portion of the diaphragm 23 and screws 33 may be provided passing through an opening in the screen 32, an aperture in the diaphragm 23 and also threading into suitable threads formed in a lifting eye 34.

The pipe section 15 is provided with a telescoping tube 35 carrying on its upper end a plate 36. The tube 35 is apertured in a plurality of places adjacent its upper end as at 37.

The insert 14 has a shoulder 38 formed therein at the upper end of the pipe section 15 and a coil spring 39 is provided, the lower end of which bears upon the shoulder 38 and the upper end of which supports the underside of the plate 36.

When it is desired to fill the sink or basin 10, the lifting eye 34 is pressed downwardly, thus causing the resilient diaphragm 23 to snap into the position shown in Figure 3 in which the folds 24 and 25 are downwardly bent. The pressure of the resilient diaphragm 23 will cause the seat portion 31 to contact the plate 36, thus closing the drain. The accumulation of hydrostatic head in the basin will serve further to press downwardly upon the diaphragm 23 and urge the seat 31 into intimate non-leaking contact with the plate 36. However, upon the accumulation of a predetermined hydrostatic head, which head is determined by the strength of the spring 39 in compression, the plate 36 will be depressed, allowing the excess fluid to pass between the plate 36 and the seat 31, through openings 37 and down the drain. As the amount of fluid in excess of the predetermined hydrostatic head has been thus drained, the plate 36 will be biased by the spring 39 back into sealing contact with the seat 31, as shown in Figure 3. When it is desired to completely drain the basin, the lifting eye 34 is lifted upwardly causing the folds 24 and 25 to reverse as shown in Figure 2, leaving the seat 31 spaced substantially from the plate 36 and permitting the basin to drain.

It will be apparent from the foregoing description that the drain of this invention may be readily disassembled in several ways. If it is desired to disconnect the drain from the bottom, it suffices to remove the ring 18, in which case the insert 14, having previously been disconnected from the trap, may be bodily lifted from the basin. If it is desired simply to clean out the drain itself, the screws 27 may be removed, thus permitting the removal of the ring 26, the diaphragm 23 and the plate 36 with its associated tube 35 and spring 39.

The foregoing facility of disassembly, of course, also provides for ready assembly in manufacture, but is particularly designed so that the user may readily clean from the drain any trapped foreign matter, thus promoting cleanliness and sanitation.

While there has been described what is at present considered to be the preferred embodiment of the invention, it is to be understood that various changes and modifications can be made therein without departing from the essence of the invention, and it is intended to cover herein all such changes and modifications as come within the true spirit and scope of the appended claims.

I claim:

1. A drain valve comprising: a resilient diaphragm; an aperture in said diaphragm; a seat portion on said diaphragm adjacent said aperture; a sealing member; a snap member in said diaphragm adapted to resiliently bias said diaphragm to engage said seat with said sealing member in one position and to support said diaphragm in spaced relation to said seat in another position; and resilient means biasing said sealing member into sealing contact with said diaphragm, said resilient means being movable away from said diaphragm responsive to a predetermined hydrostatic head thereon.

2. A drain valve comprising: a resilient diaphragm having a seat portion, an aperture in said diaphragm, a sealing member, a resilient member yieldingly biasing said sealing member into sealing contact with said seat portion, snap portions in said resilient diaphragm adapted in one position to bias said seat portion into sealing contact with said sealing member and in another position to support said seat portion in spaced position from said sealing member.

3. A drain valve comprising: a resilient diaphragm having a seat portion, an aperture in said diaphragm, a screen in said aperture, a sealing member, a resilient member yieldingly biasing said sealing member into sealing contact with said seat portion, and snap portions in said resilient diaphragm adapted in one position to bias said seat portion into sealing contact with said sealing member and in another position to support said seat portion in spaced position from said sealing member.

4. A drain valve comprising: a resilient diaphragm having a seat portion, an aperture in said diaphragm, a sealing member, a resilient member yieldingly biasing said sealing member into sealing contact with said seat portion, snap portions in said resilient diaphragm adapted in one position to bias said seat portion into sealing contact with said sealing member and in another position to support said seat portion in spaced position from said sealing member, and said member yieldingly biasing said sealing member being adapted to be overcome by a hydrostatic head on said sealing member to open said sealing member to drain.

5. A drain valve comprising: a resilient diaphragm having a seat portion, an aperture in said diaphragm, a screen in said aperture, a sealing member, a resilient member yieldingly biasing said sealing member into sealing contact with said seat portion, snap portions in said resilient diaphragm adapted in one position to bias said seat portion into sealing contact with said sealing member and in another position to support said seat portion in spaced position from said sealing member, and said member yieldingly biasing said sealing member being adapted to be overcome by a hydrostatic head on said sealing member to open said sealing member to drain.

6. A drain valve comprising: a rubber-like resilient diaphragm; an aperture in said diaphragm; a seat portion on said diaphragm adjacent said aperture; a sealing member; a snap member in said diaphragm adapted to resiliently bias said diaphragm to engage said seat with said sealing member in one position and to support said diaphragm in spaced relation to said seat in another position; and resilient means biasing said sealing member into sealing contact with said diaphragm, said resilient means being movable away from said diaphragm responsive to a predetermined hydrostatic head thereon.

7. A drain valve comprising: a rubber-like resilient diaphragm having a seat portion, an aperture in said diaphragm, a sealing member, a resilient member yieldingly biasing said sealing member into sealing contact with said seat portion, snap portions in said resilient diaphragm adapted in one position to bias said seat portion into sealing contact with said sealing member and in another position to support said seat portion in spaced position from said sealing member.

8. A drain valve comprising: a rubber-like resilient diaphragm having a seat portion, an aperture in said diaphragm, a screen in said aperture, a sealing member, a resilient member yieldingly biasing said sealing member into sealing contact with said seat portion, and snap portions in said resilient diaphragm adapted in one position to bias said seat portion into sealing contact with said sealing member and in another position to support said seat portion in spaced position from said sealing member.

9. A drain valve comprising: a rubber-like resilient diaphragm having a seat portion, an aperture in said diaphragm, a sealing member, a resilient member yieldingly biasing said sealing member into sealing contact with said seat portion, snap portions in said resilient diaphragm adapted in one position to bias said seat portion into sealing contact with said sealing member and in another position to support said seat portion in spaced position from said sealing member, and said member yieldingly biasing said sealing member being adapted to be overcome by a hydrostatic head on said sealing member to open said sealing member to drain.

ZOLTAN JOHN SOGORKA.

REFERENCES CITED

The following references are of record in the file of this patent:

UNITED STATES PATENTS

| Number | Name | Date |
|---|---|---|
| 478,489 | Whitman | July 5, 1892 |
| 973,609 | Abrams | Oct. 25, 1910 |
| 1,102,647 | Davis | July 7, 1914 |
| 1,493,774 | Dorsey | May 13, 1924 |
| 1,907,299 | Kudolla | May 2, 1933 |
| 2,136,898 | Thomas | Nov. 15, 1938 |

FOREIGN PATENTS

| Number | Country | Date |
|---|---|---|
| 107,058 | Great Britain | June 14, 1917 |